(12) United States Patent
Uchida

(10) Patent No.: US 6,685,015 B2
(45) Date of Patent: *Feb. 3, 2004

(54) OPTICAL DISC ACCOMMODATING CASE

(75) Inventor: Hiromichi Uchida, Tokyo (JP)

(73) Assignee: Toyo Chemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/977,353

(22) Filed: Oct. 16, 2001

(65) Prior Publication Data

US 2002/0046960 A1 Apr. 25, 2002

(51) Int. Cl.$^7$ ............................................... B65D 85/57
(52) U.S. Cl. .................... 206/308.1; 206/751; 206/759; 206/307; 206/303
(58) Field of Search .................. 206/308.1, 308.3, 206/309–313, 751, 759, 760, 307, 303; 312/9.57; 70/57.1

(56) References Cited

U.S. PATENT DOCUMENTS

| | | | | |
|---|---|---|---|---|
| 4,793,480 A | * | 12/1988 | Gelardi et al. | 206/308.1 |
| 5,593,031 A | * | 1/1997 | Uchida | 206/308.1 |
| 5,597,068 A | * | 1/1997 | Weisburn et al. | 206/308.1 |
| 5,662,216 A | * | 9/1997 | Nesbitt et al. | 206/308.1 |
| 6,155,417 A | * | 12/2000 | Flores et al. | 206/308.1 |
| 6,283,284 B1 | * | 9/2001 | Crane et al. | 206/310 |
| 6,371,300 B1 | * | 4/2002 | Uchida | 206/751 |

FOREIGN PATENT DOCUMENTS

GB           2154550 A   *   9/1985   ............ B65D/25/10

* cited by examiner

Primary Examiner—Jila M. Mohandesi
(74) Attorney, Agent, or Firm—Wenderoth, Lind, Ponack, L.L.P.

(57) ABSTRACT

An optical disc accommodating case is provided, which permits quick and smooth accommodation and removal of an optical disc, permits reliable accommodation of the disc without causing contamination or scars and scratches to the disc, and permits coping with an assembling process in which the disc is automatically loaded into the case by a robot. A disc holder having an optical disc support has a wall to be in contact with an edge of an optical disc for preventing detachment of the optical disc in a horizontal direction. The wall has lock members for preventing upward detachment of the optical disc. The wall with the lock members is flexible, and the lock members are capable of being flexed toward an outer periphery of the optical disc to permit the optical disc to be accommodated on the optical disc support while the optical disc is pushed in a downward direction.

18 Claims, 14 Drawing Sheets

OPTICAL DISC ACCOMMODATING CASE

FIELD OF THE INVENTION

This invention relates to optical disc accommodating cases for accommodating a DVD, a musical compact disc or such an optical disc as a computer CD-ROM and, more particularly, to optical disc accommodating cases, which are contrived so as to permit quick and smooth accommodation or removal of an optical disc, permit reliable accommodation of an optical disc without causing contamination or damage to the disc, and permit automation of loading of an optical disc during an assembling step.

PRIOR ART

A prior art optical disc accommodating case for accommodating an optical disc comprises a disc holder for holding the optical disc with a central hole thereof engaged with a boss of the disc holder, a base member for engaging with the disc holder, and a lid hinged to one side of the base member. This optical disc accommodating case is simple in construction and is thus extensively used for accommodating musical compact discs and computer CD-ROMs to be sold. Also, a case for accommodating a DVD has an integral structure, in which a holder having a boss and a lid capable of being opened and closed are hinged together.

In the meantime, recent multi-functional high quality recording media such as DVDs require players and discs to have higher dimensional accuracy than conventional compact discs. However, in the prior art optical disc accommodating case for protecting the optical disc, the boss may touch and cause damage, even if slightly, to an inner periphery of the central hole of the disc when the disc is fitted on and removed from the boss of the disc holder. When the inner periphery of the central hole of the optical disc is damaged even slightly, a clearance is generated between the damaged inner periphery and a spindle for rotating the optical disc, resulting in eccentric rotation of the disc or tilting thereof from an intrinsic plane of rotation. This poses a fatal problem in that it may result in imperfect reading or writing of data from or on the disc.

In addition, in the prior art optical disc the optical disc is accommodated in close contact with a disc holder surface. Therefore, the optical disc is hardly brought to a floating state by pushing, even with a great force, the boss of the disc holder which has a spring property for taking hold of and removing the disc. Therefore, inferior manipulation property in connection with removal and accommodation of the optical disc is inevitable.

Furthermore, when removing an optical disc, a recording area thereof, of which touching should be avoided as much as possible, is frequently touched by fingers, resulting in generation of scars and scratches or contamination.

The inventor earlier proposed, in Japanese Patent Application No. 11-306343 and Japanese Patent Application No. 2000-136889, an optical disc accommodating case, which permits an accommodated optical disc to be very readily removed without causing scars and scratches or contamination of a recording portion of the disc, as well as permitting removal and accommodation of the disc without causing damage to the very important central hole of the disc.

This prior art optical disc accommodating case is excellent in that it can be conveniently used by a user and is free from possibility of scars and scratches to an optical disc. However, this optical disc accommodating case has a problem with regard to automatic loading of an optical disc thereinto. With musical compact discs or the like, an operation sequence from accommodating an optical disc to packaging is fully automated. More specifically, for loading an optical disc in a case, a disc held by a robot is lowered directly downwardly to bring its central hole into engagement with a boss of an optical disc accommodating case. With the above optical disc accommodating case proposed by the inventor, a lock piece for preventing detachment of the optical disc interferes with loading, thereby making it impossible to load the disc.

SUMMARY OF THE INVENTION

The invention accordingly has an object of providing an optical disc accommodating case, which permits quick and smooth accommodation and removal of an optical disc, permits reliable accommodation of the disc without causing scars and scratches or contamination, and can cope with an assembling operation in which the optical disc is loaded into the case via automatic operation by a robot.

DETAILED DESCRIPTION OF THE PREFERRED EMBODIMENTS

Figure 1:
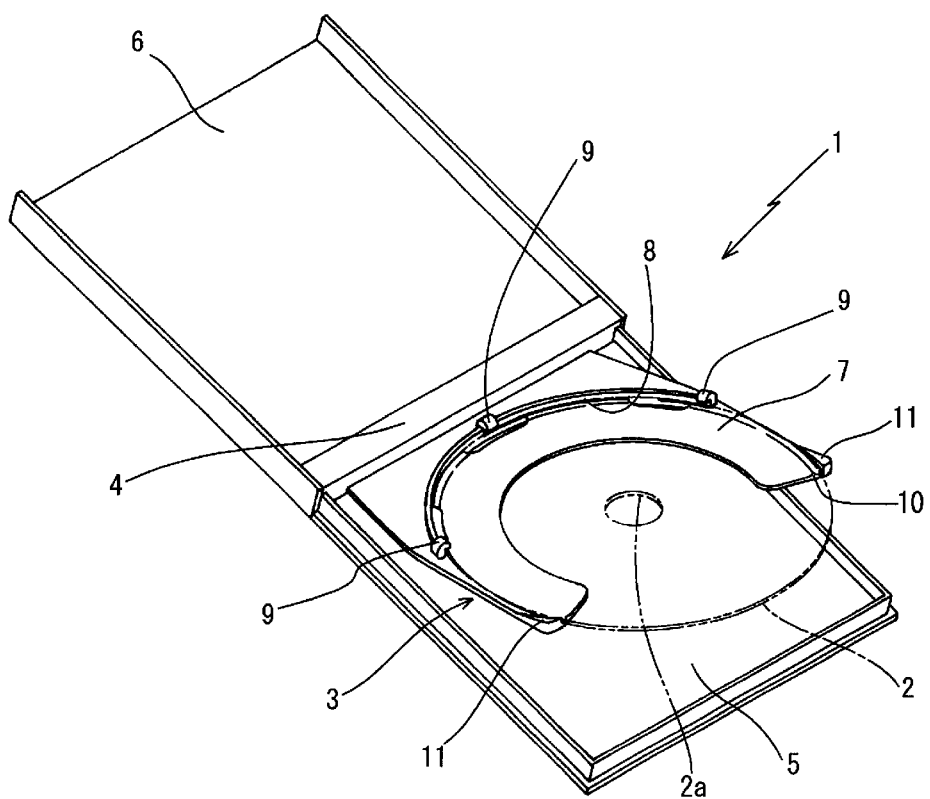
FIG. 1 is a perspective view showing a first embodiment of an optical disc accommodating case according to the invention.
Figure 2:
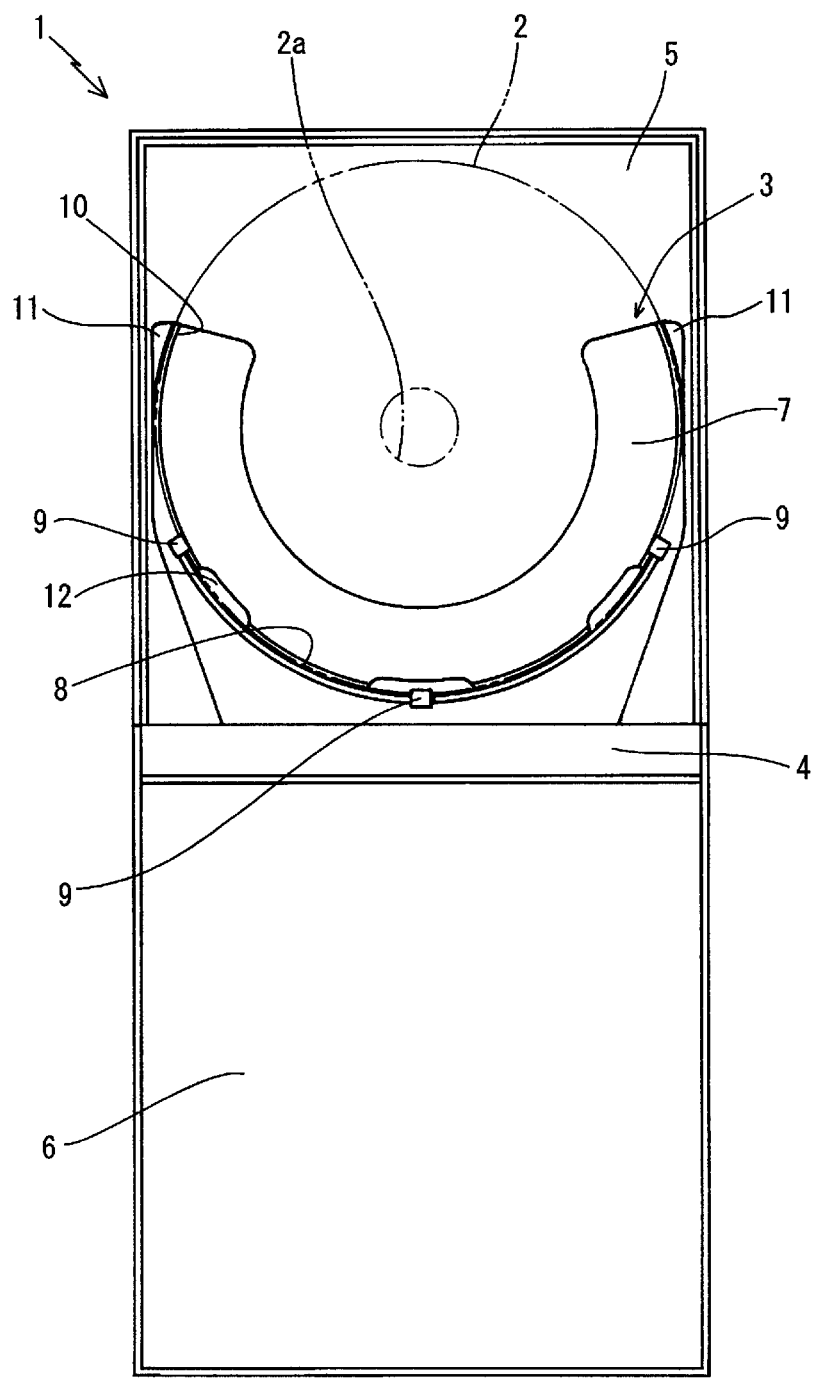
FIG. 2 is a plan view showing the first embodiment of the optical disc accommodating case according to the invention.

FIGS. 1 to 10 show a first embodiment of an optical disc accommodating case according to the invention. Referring to FIG. 1, reference numeral 1 designates the optical disc accommodating case made of a synthetic resin, which is used for a musical compact disc, a DVD, and the like. The optical disc accommodating case 1 comprises a disc holder 3 for detachably holding an optical disc 2, a base member 5 with a rear end thereof detachably engaged by a stem 4 of the disc holder 3, and a lid 6 detachably hinged to a rear end of the base member 5 for opening and closing the base member 5 so as to expose a top of the optical disc 2. The base member 5 and the lid 6 together constitute a casing.

The disc holder 3 includes the stem 4 detachably engaging with the rear end of the base member 5 and a disc bottom support 7, which is integral with or a separate member from the stem 4 and can hold the optical disc 2 in a forwardly upwardly tilted state. The disc bottom support 7 extends in an upwardly tilted state form the stem 4 relative to the base member 5 into space therein. The disc bottom support 7 is made of an appropriate flexible synthetic resin so that it is vertically lockable and can be accommodated in the casing with the lid 6 in a closed state.

Specifically, when the lid 6 is open, the disc holder 3, which is flexible such that it is vertically lockable about the stem 4 as a fulcrum and biased to a forwardly upwardly tilted state, extends in the forwardly upwardly tilted state from the stem 4 to a front end in space of the base member 5, and holds the optical disc 2 in a tilted state to permit the optical disc 2 to be suitably removed and accommodated. By closing the lid 6 into engagement with the base member 5, the disc holder 3 is pushed down by the lid 6, and thus it is accommodated in the casing.

The disc holder 3 has the disc bottom support 7 formed on top of its front end portion. The disc bottom support 7 has a diametrical dimension such that it can support the optical disc 2 in contact with more than one half of an edge of the disc 2. To prevent detachment of the optical disc 2 toward the stem 4, the disc bottom support 7 also has a wall 8 provided as a single member, or a plurality of divisions (i.e., two divisions in this embodiment), on a stem side so as to be in contact with part of the edge of the optical disc 2. Also, to prevent detachment of the optical disc 2 upwardly, the disc bottom support 7 has three, i.e., opposite end and central, lock members 9 so as to extend over a top of the optical disc for clamping part of the edge of the optical disc 2 in cooperation with a ridge 10.

Figure 3:
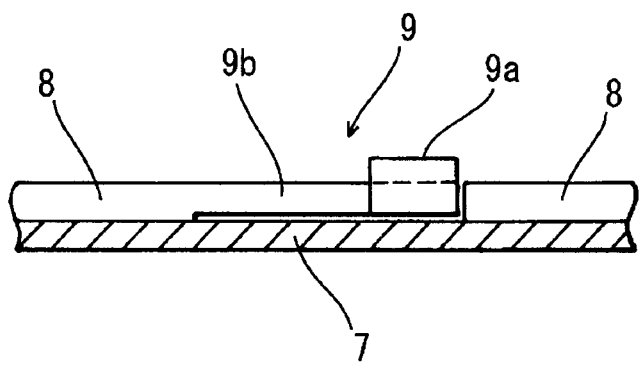
FIG. 3 is a fragmentary sectional view showing a lock member in the optical disc accommodating case according to the invention.
Figure 4:
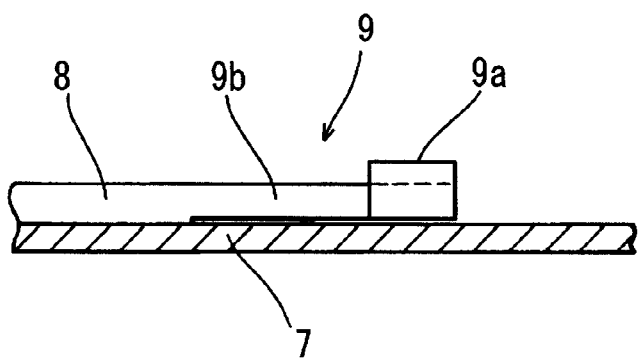
FIG. 4 is a fragmentary perspective view showing a lock member in the optical disc accommodating case according to the invention.
Figure 8:
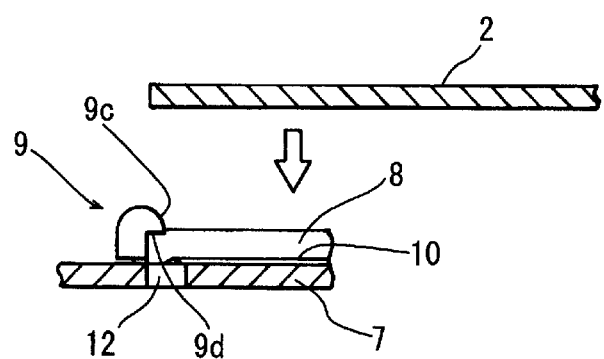
FIG. 8 is a fragmentary sectional view showing the optical disc accommodating case according to the invention in a state before locking an optical disc with the lock members.
Figure 9:
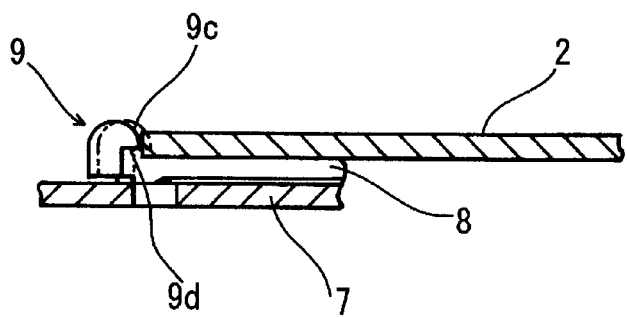
FIG. 9 is a fragmentary sectional view showing the optical disc accommodating case according to the invention in a state that the optical disc is being locked with the lock members.
Figure 10:
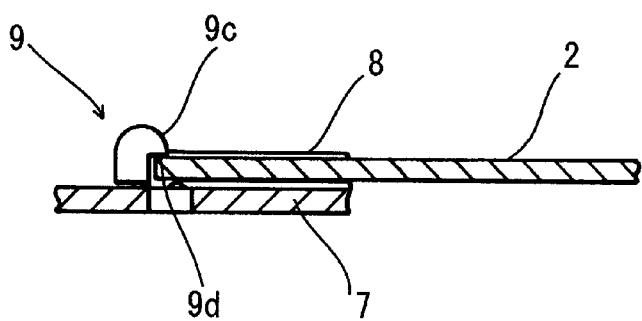
FIG. 10 is a fragmentary sectional view showing the optical disc accommodating case according to the invention in a state that the optical disc is locked with the lock members.

As shown in FIGS. 3 and 4, the lock members 9 each have an end locking portion 9a. In order that the lock members 9 are capable of flexing in a circumferential direction of the optical disc, each lock member 9 has one side separated from the wall 8. (FIG. 4 shows an end lock member at an end, so that no division of the wall is present.) A portion of the wall 8 is formed with a thin flexible portion 9b, which is formed by cutting off a lower wall portion so that it is spaced apart from the disc bottom support 7. As shown in FIGS. 8 to 10, each end locking portion 9a has an upper portion 9c which is downwardly tapered (with either a curved or a straight cross-sectional profile) toward an inner periphery of the optical disc 2. When the end locking portion 9a is contacted by the edge of the optical disc 2 upon being lowered, the end locking portion is flexed toward the optical disc edge so as to allow the optical disc 2 to be continually lowered. A bottom of the portion 9c is constituted by a stepped locking surface 9d that is substantially parallel to an accommodated optical disc top, thus holding the optical disc 2, once locked, so as to be held in this state without being upwardly detached.

The ridge 10 noted above is provided on a top of the disc bottom support 7 slightly on an inner side of the wall 8. The ridge 10 has a triangular cross-sectional profile so that it can be in contact with only the edge of the optical disc 2, i.e., a non-recording portion thereof, thus avoiding damage to a recording portion of the optical disc 2 due to otherwise possible contact with the top of the disc bottom support 7. A central portion of the disc bottom support 7 is greatly notched from a front end portion so as to not be in contact with the optical disc 2, and also has no bearing on accommodation and removal of the disc 2.

A front end portion of the disc bottom support 7 has opposite side stoppers 11 to prevent detachment of the optical disc 2 in a forward direction. The stoppers 11 have a height level greater than the wall 8 so that the optical disc 2 can be removed by moving the disc 2 in an upward direction toward the front so as to raise a front portion of the disc 2.

In the optical disc accommodating case 1 having the above construction according to the invention, the optical disc 2 is loaded onto the disc bottom support 7 in the same manner as in the prior art optical disc accommodating case as described previously. Specifically, the optical disc 2 held in a forwardly downwardly tilted state is moved in a forwardly downward direction toward the stem of the disc bottom support 7. When a leading portion of the optical disc 2 strikes the wall 8, the disc 2 has cleared the stoppers 11. By lowering in this state, a trailing portion of the optical disc 2 comes into contact with the disc bottom support 7 and the disc 2 is loaded onto the disc bottom support 7. Consequently, the optical disc 2 is prevented by the wall 8 and the lock members 9 from being detached toward the stem, and it is also prevented by the stoppers 11 from being detached toward a front end of the disc bottom support 7.

Figure 5:
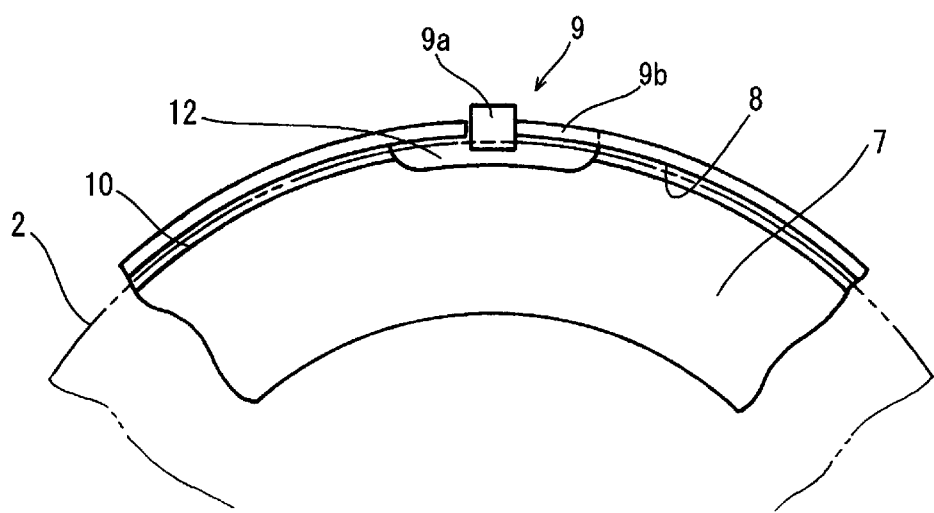
FIG. 5 is a fragmentary plan view showing the optical disc accommodating case according to the invention in a state before locking an optical disc with lock members.
Figure 6:
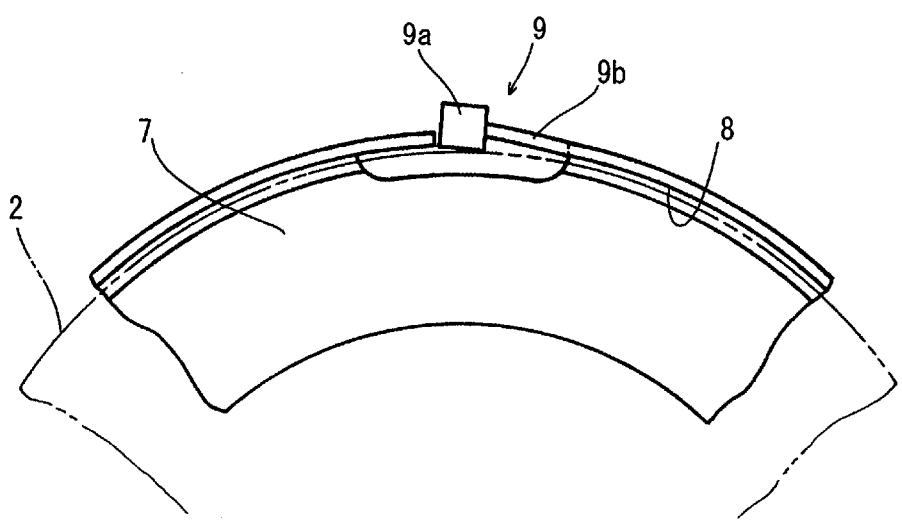
FIG. 6 is a fragmentary plan view showing the optical disc accommodating case according to the invention in the state before locking the optical disc with the lock members.
Figure 7:
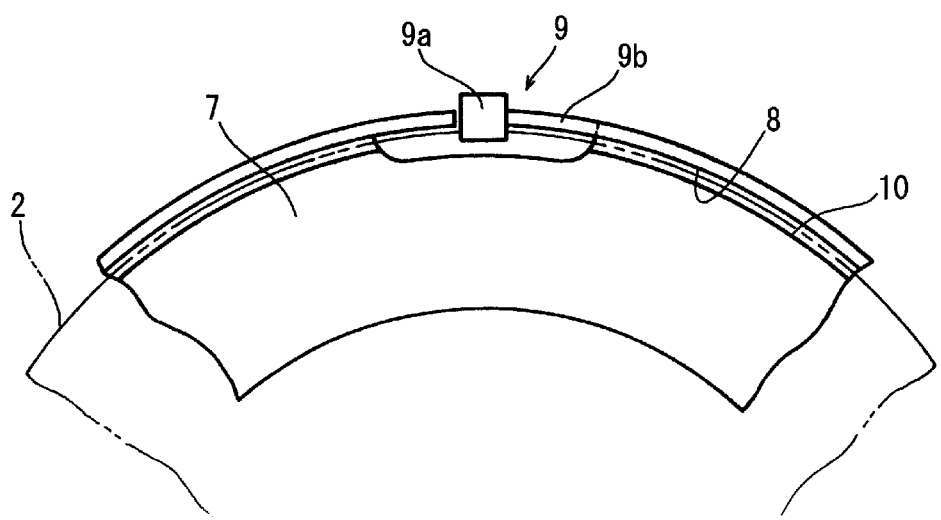
FIG. 7 is a fragmentary plan view showing the optical disc accommodating case according to the invention in a state with the optical disc locked with the lock members.

In a case of automatic loading of an optical disc with a robot, as shown in FIGS. 5 and 8, optical disc 2 is first held at a position above the disc bottom support 7 such that it is parallel thereto. Then, the optical disc 2 is lowered directly downwardly. Then, when an edge of the optical disc 2 strikes the portions 9c of the lock members 9, the end locking portions 9a are pushed by the disc 2 so as to be flexed circumferentially outwardly upon flexing of the flexible portions 9b. The optical disc 2 is continually lowered, and when it strikes the top of the disc bottom support 7, as shown in FIGS. 7 and 10, the end locking portions 9a no longer receive a pushing force from the optical disc 2, and are returned circumferentially inwardly of the disc 2 to be restored to their initial positions. Thus, the stepped locking surfaces 9d are hooked on a top of the edge of the optical disc 2, and the disc 2 is thus loaded onto the disc bottom support 7 so as to be prevented from being detached. Reference numeral 12 designates notches which are necessary for forming the flexible portions 9b of the lock members 9.

When removing the optical disc 2 from the disc bottom support 7, as in the prior art optical disc accommodating case described above, the disc 2 is taken hold of between a front end portion and a periphery of the center hole 2a, a front end of the disc 2 is then raised to a height level above the stoppers 11, and in this state the disc 2 is moved in an upwardly inclined direction toward the front. In this way, the optical disc 2 can be readily removed.

Figure 11:
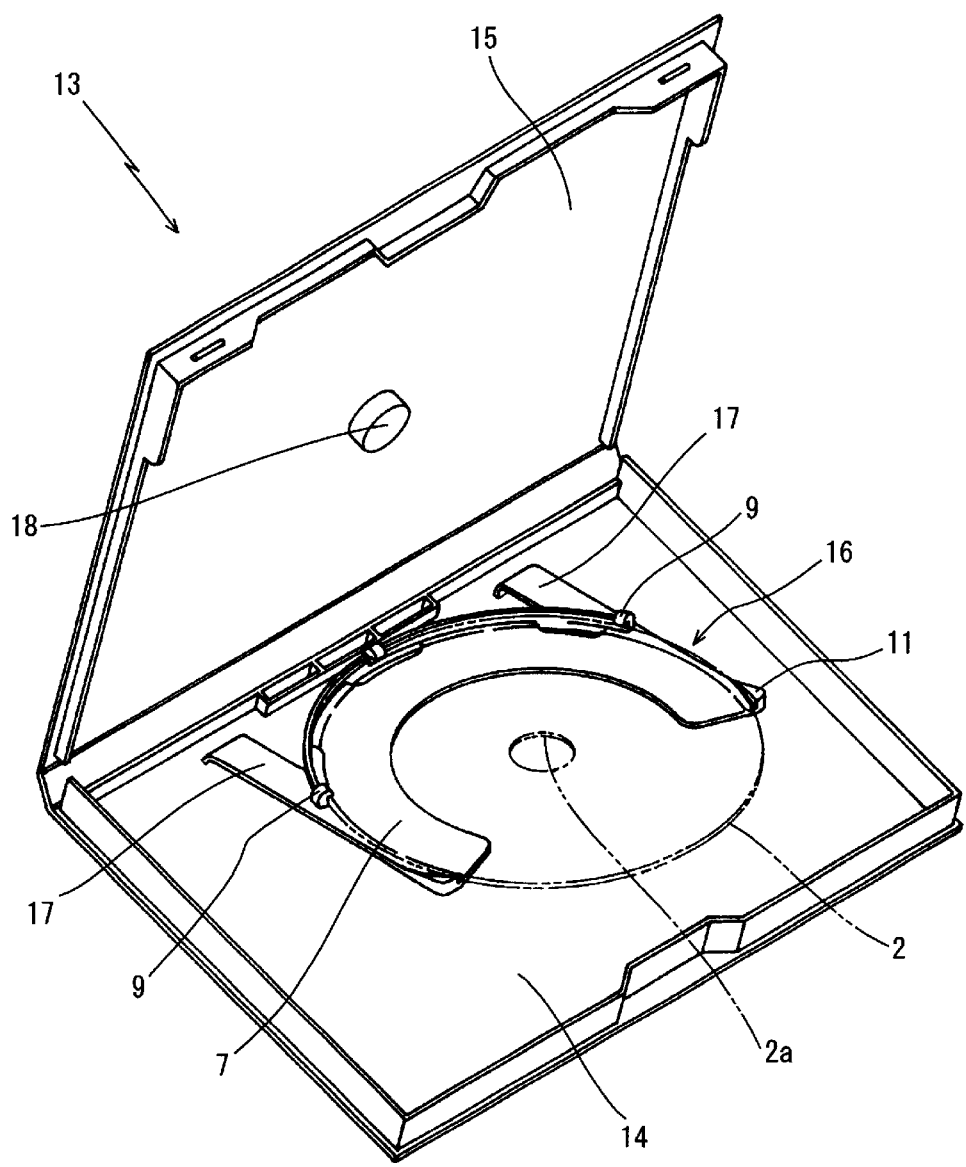
FIG. 11 is a perspective view showing a second embodiment of the optical disc accommodating case according to the invention.

FIG. 11 shows a second embodiment of an optical disc accommodating case according to the invention, which is mainly used for a DVD. This optical disc accommodating case 13 has an integral structure, in which a base member 14 and a lid 15 are hinged together along one side such that the lid 15 can open and close the base member 14. On an inner surface of the base member 14, an integral disc holder 16 is disposed such that it is biased by a flexible stem 17 so as to extend in a forwardly upwardly tilted state toward a space in the base member 14, and such that an extending portion is vertically lockable. The disc holder 16 has a disc support 7 of the same structure as in the first embodiment for detachably holding an optical disc 2.

In this optical disc accommodating case 13, when the lid 15 is opened in a state that the optical disc 2 is accommodated in the case, the disc holder 16 is raised by a biasing force of the flexible stem 17 so as to be held in a state tilted by about 10 to 30 degrees in the space of the base member 14. In this state, an edge of a front end portion of the optical disc 2 and an inner periphery of a central hole of the disc 2 can be readily taken hold of by two fingers without touching a recording surface of the disc 2. The optical disc 2 can be readily removed from the disc holder 16 by raising a front end of the disc 2 and pulling the disc 2 toward the front end thereof so that the disc 2 clears stoppers 11. Reference numeral 18 designates a substantially cylindrical disc center hole fitting member for preventing detachment of the optical disc 2 from the disc support 7 when a great shock is exerted to the optical disc accommodating case 13. The disc central hole fitting member 18 may be dispensed with if it interferes with accommodation of an instruction manual or the like inside the lid 15.

Figure 12:
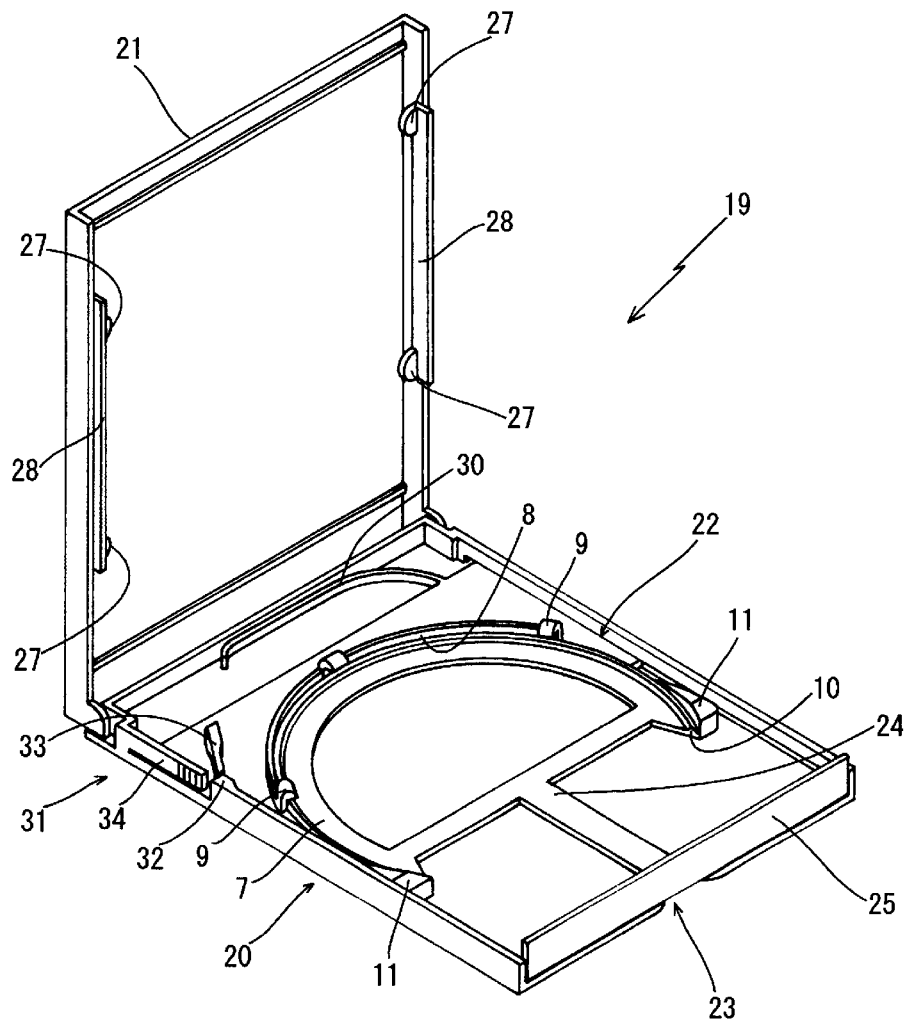
FIG. 12 is a perspective view showing a third embodiment of the optical disc accommodating case according to the invention.

FIG. 12 shows a third embodiment of an optical disc accommodating case according to the invention. In the preceding two embodiments of the optical disc accommodating case, the disc holder has its stem disposed in the case at a fixed position thereof, and is always held in an upwardly tilted state. In this embodiment of optical disc accommodating case 19, however, a disc holder 22 is slidably disposed in a casing, which comprises a base member 20 and a lid 21 covering the base member, and projects from an opening 23 formed in the casing at a front end thereof.

A top of the disc holder 22 has a disc bottom support 7, which is the same as in the previous two embodiments, and can detachably hold an optical disc 2. The disc holder top also has a ridge 10 with a cross-sectional profile, which is adapted to be in contact with a non-recording edge part of the optical disc 2 so as not cause damage to a recording part of the disc. The disc holder top further has a wall 8 provided on a stem side of the disc bottom support 7 so as to be in contact with an edge of the optical disc 2 for preventing detachment of the disc in a stem-ward direction. The wall 8 has three hooks 9 extending above the disc bottom support 7 and co-operating with the ridge 10 to clamp the edge of the optical disc 2 for preventing upward detachment of the disc from a top of the disc bottom support 7. The disc bottom support 7 has front end stoppers 11 provided on both sides for preventing detachment of the optical disc 2 in a forward direction. The disc bottom support 7 also has an integral inverse T-shaped front end extension 24. At a front end of the front end extension 24, a lid member 25 for covering the opening 23 is provided as an integral or separate part.

Figure 14:
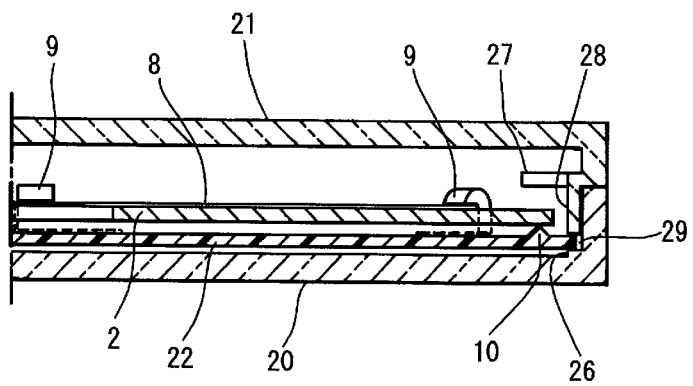
FIG. 14 is a plan view showing the third embodiment of the optical disc accommodating case according to the invention.
Figure 15:
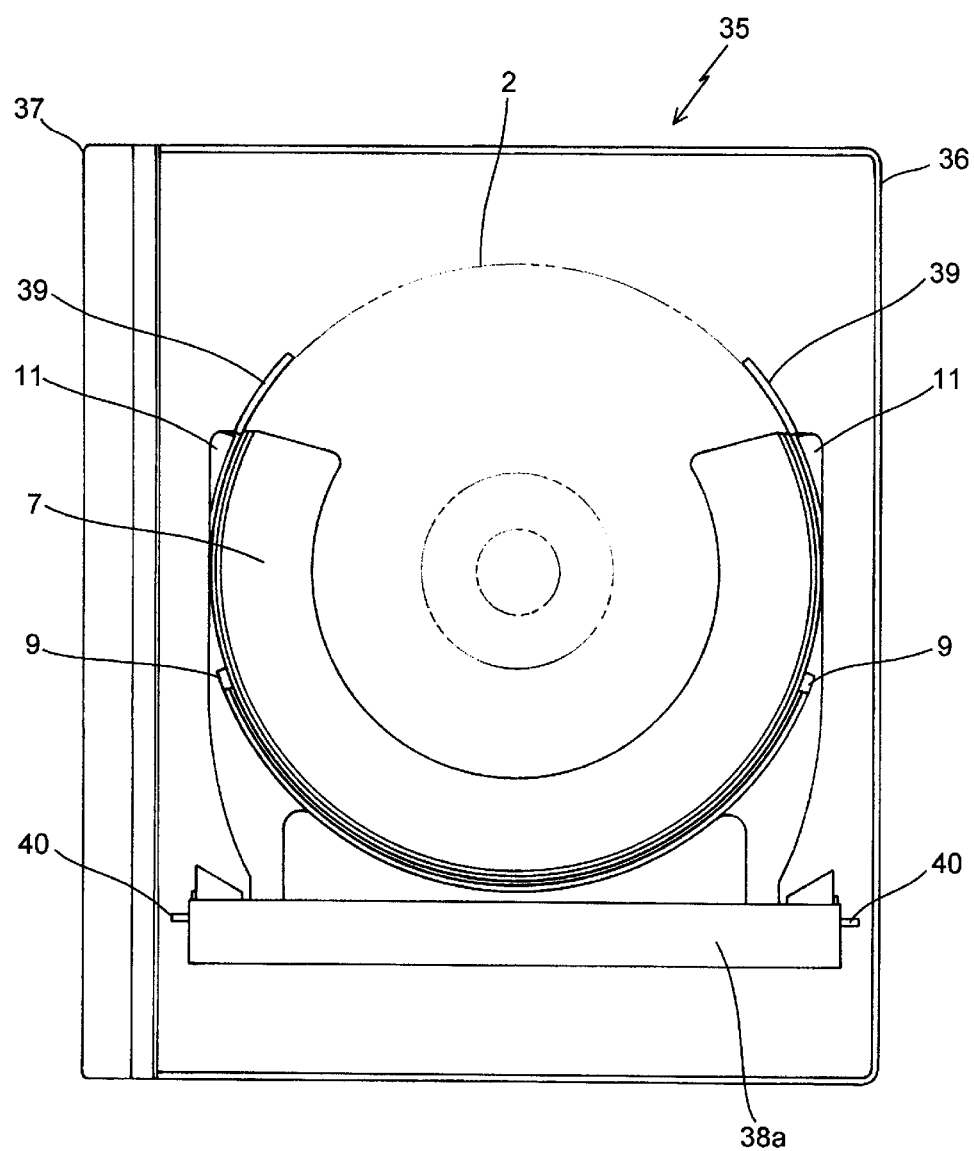
FIG. 15 is a plan view showing a fourth embodiment of the optical disc accommodating case according to the invention.

As shown in FIG. 14, opposite side inner surfaces of the base member 20, in which the disc holder 22 is slidable, have slightly stepped portions 26 for reducing an area of contact between the disc holder 22 and the base member 20, and thus permitting smoother sliding of the disc holder 22. Opposite side inner surfaces of the lid 21 have four hooks 27 for accommodating a jacket, a liner note, a manual, and the like concerning an accommodated optical disc. Opposite sides of the lid 21 also have guides 28, each of which strides two hooks 27 on each side of the lid 21 and face opposite side edges of the disc holder 22 for permitting smooth sliding of the disc holder 22 in the base member 20 over a bottom thereof. The guides 28 each define with the bottom of the base member 20 a guide gap 29 having a width dimension that is slightly greater than a thickness of the disc holder 22. With opposite side inner guide gaps 29 having a fixed width dimension formed in the casing, the disc holder 22 slides along the guide gaps 29 in a stable state without being tilted, rattled or caught.

Reference numeral 30 designates an elastic spring part integral with a rear end of the disc holder 22. The spring part 30 is adapted to push a rear end wall of the base member 22 and thus bias the disc holder 22 in a direction to project out of the opening 23. Should the disc holder 22 be detached through the opening 23, at least one of the stepped portions 26 has a raised portion formed on an opening side end and thus acts as a stopper. A stepped portion formed in an intermediate part of at least one side wall of the disc holder 22 is adapted to be in contact with the above stopper.

Figure 13:
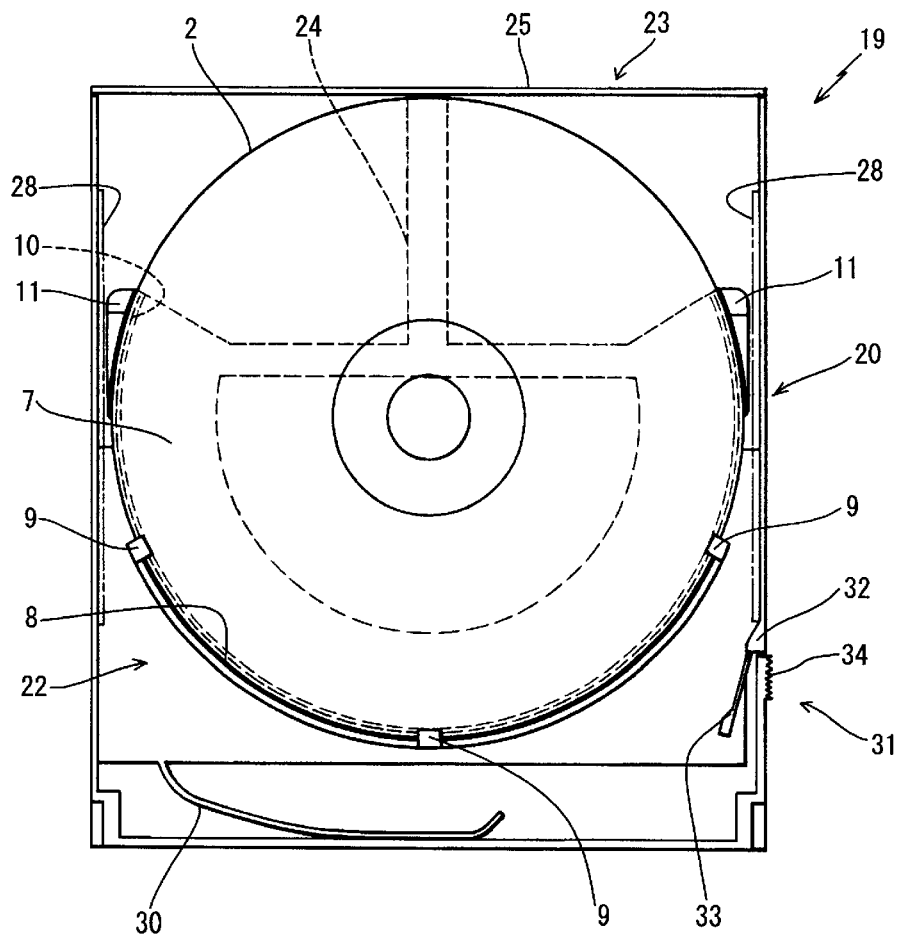
FIG. 13 is a sectional view showing the third embodiment of the optical disc accommodating case according to the invention.

Referring to FIG. 13, reference numeral 31 designates a lock device for locking the disc holder 22 in the casing. The lock device 31 has a locking portion 32 projecting from one inner side surface of the base member 20, and a lock piece 33 provided on one side of a rear part of the disc holder 22. The lock piece 33 has a stem portion secured to the disc holder 22, and its remainder portion is elongate, flexible and capable of being flexed in a plane of the disc holder 22 when biased. When not biased, a free end of the flexible portion is held hooked on the locking portion 32.

Reference numeral 34 designates a lock release member for inwardly pushing the free end of the flexible portion of the lock piece 33. The lock release member 34 is a flexible operable part, which can project into the base member 20 when its finger-touch end portion is pushed. When a free end of the lock release member 34 is pushed in a releasing direction with the disc holder 22 held locked in the base member 20, the free end of the flexible portion of the lock piece 33, having been held locked on the locking portion 32, clears the locking portion 32. Thus, the disc holder 22 which is biased by the spring part 30, projects out of the opening 23. To lock the disc holder 22 in the base member 20, the lid member 25 projecting out of the opening 23 is pushed in a direction of accommodating the disc holder 22. Doing so causes the free end of the flexible portion of the lock piece 33 to be moved along the locking portion 32 while being flexed by a slanted side surface thereof until it clears the locking portion, whereupon it no longer receives biasing force of the slanted side surface of the locking portion 32. As a result, the free end of the flexible portion of the lock piece 33 is restored to its initial position. Now, pushing of the disc holder 22 into the base member 20 may be discontinued, while an end of the flexible portion of the lock piece 33 has been held locked on the locking portion 32. Thus, the disc holder 22 is held in a locked state in the base member 20.

FIGS. 15 to 21 show a fourth embodiment of an optical disc accommodating case according to the invention. This optical disc accommodating case 35, like the previous second embodiment, is mainly used for a DVD, and particularly it has a construction, which is more suitable for robotic operation of an assembling process which is important for this type of optical disc accommodating case. In robotic operation of an assembling process for accommodating an optical disc in an optical disc accommodating case and packing a resultant case, a disc holder should pass through a gap with a height of about 10 mm in a state in which a lid is held open. This means that a front end of the disc holder should not be raised from a top of a base member. This embodiment meets this requirement. Nevertheless, the embodiment has a construction capable of being readily handled by a user in that the front end of the disc holder is vertically moved as the lid is opened and closed.

Figure 16:
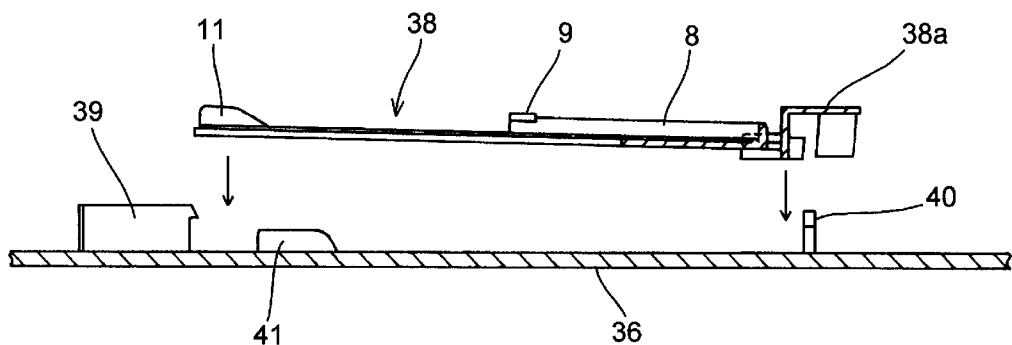
FIG. 16 is a fragmentary sectional view showing the fourth embodiment of the optical disc accommodating case according to the invention.
Figure 17:
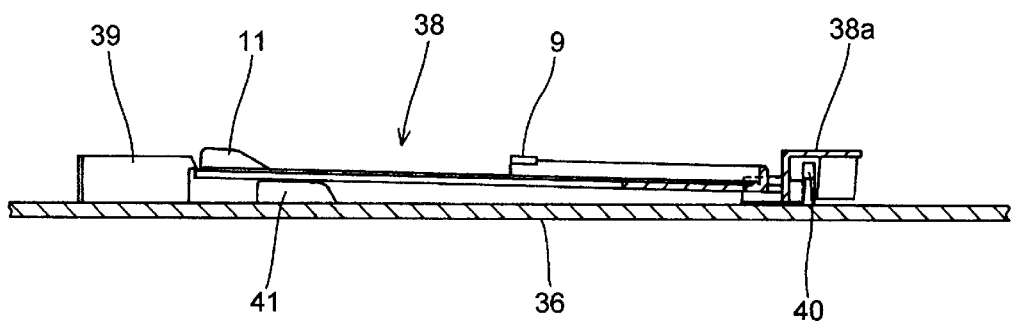
FIG. 17 is a fragmentary sectional view showing the fourth embodiment of the optical disc accommodating case according to the invention.
Figure 18:
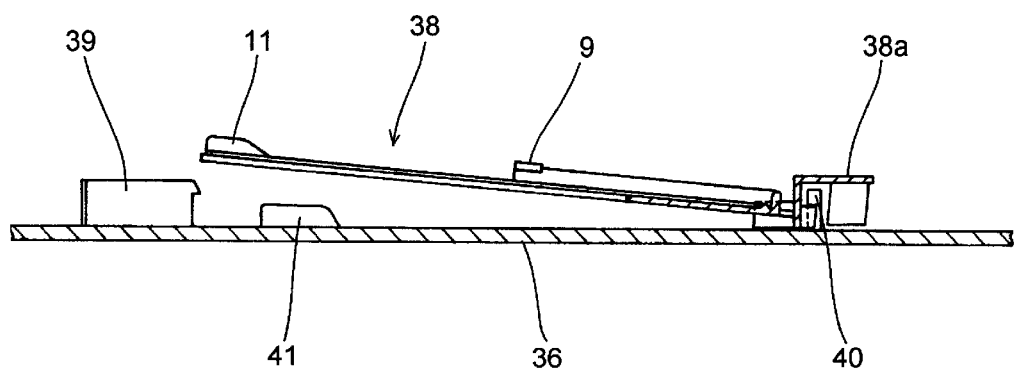
FIG. 18 is a fragmentary sectional view showing the fourth embodiment of the optical disc accommodating case according to the invention.

Optical disc accommodating case 35 has an integral structure, in which a base member 36 and a lid 37 are hinged together along one side such that the lid 37 can open and close the base member 36. The base member 36 has two lock members 39 formed on its inner surface for detachably engaging with two portions of a front end of a disc holder 38. The base member 36 also has two engagement members 40 formed on its inner surface for detachably engaging with opposite side portions of a flexible stem 38a of the disc holder 38, which is separate from the base member 36. By lowering the disc holder 38 as shown in FIG. 16, its front end and stem 38a can be readily engaged with the lock members 39 and the engagement members 40, respectively. Reference numeral 41 designates a stopper member provided on the inner surface of the base member 36 to prevent excessive downward flexing of the disc holder 38. The stopper member 41 is disposed at a position to be in contact with a bottom surface of the front end of the disc holder 38.

The lock members 39 each have a partly arched wall structure having a locking pawl formed on an inner side, and also have a function of reliably preventing an accommodated optical disc from being detached in a forward direction by a shock or the like with the front end of the disc holder 38 engagedly held with the lock members 39. When a person who bought the optical disc opens the optical disc accommodating case 35 and pushes the stem 38a of the disc holder 38 in the state shown in FIG. 17 to the right, the disc holder 38 as a whole is slightly moved to the right, and its front end is detached from the lock members 39 so that it is raised. Specifically, when the stem 38a of the disc holder 38 is engaged with the engagement members 40, like in each of the above embodiments, the disc holder 38 which is vertically lockable about its flexible stem 38a as a fulcrum, extends in a forwardly upwardly tilted state at an angle of 10 to 30 degrees.

Once the front end of the disc holder 38 has been detached form the lock members 39, by opening the lid 37 the disc holder is raised to facilitate accommodation and removal of an optical disc, and by closing the lid 37 the disc holder is downwardly tilted so that the disc holder 38 is suitably accommodated. Components other than those described above, i.e., disc bottom support 7, wall 8, lock members 9 having locking end portions 9a, flexible portions 9b, tapered portions 9c and stepped locking surface 9d, ridge 10 and stoppers 11, are the same as in the other embodiments described previously. However, while in the other embodiments three lock members 9 are formed on the wall 8, in this embodiment only two, i.e., left and right, lock members are provided to simplify construction. Even with only two lock members 9, it is possible to sufficiently prevent upward detachment of an optical disc. In addition, when locking end portions 9a are contacted by an edge of a lowered optical disc 2, they are flexed circumferentially of the disc, while the stepped locking surface 9d at a lower end of the tapered portions 9c prevent upward detachment of the optical disc having once been locked.

Figure 19:
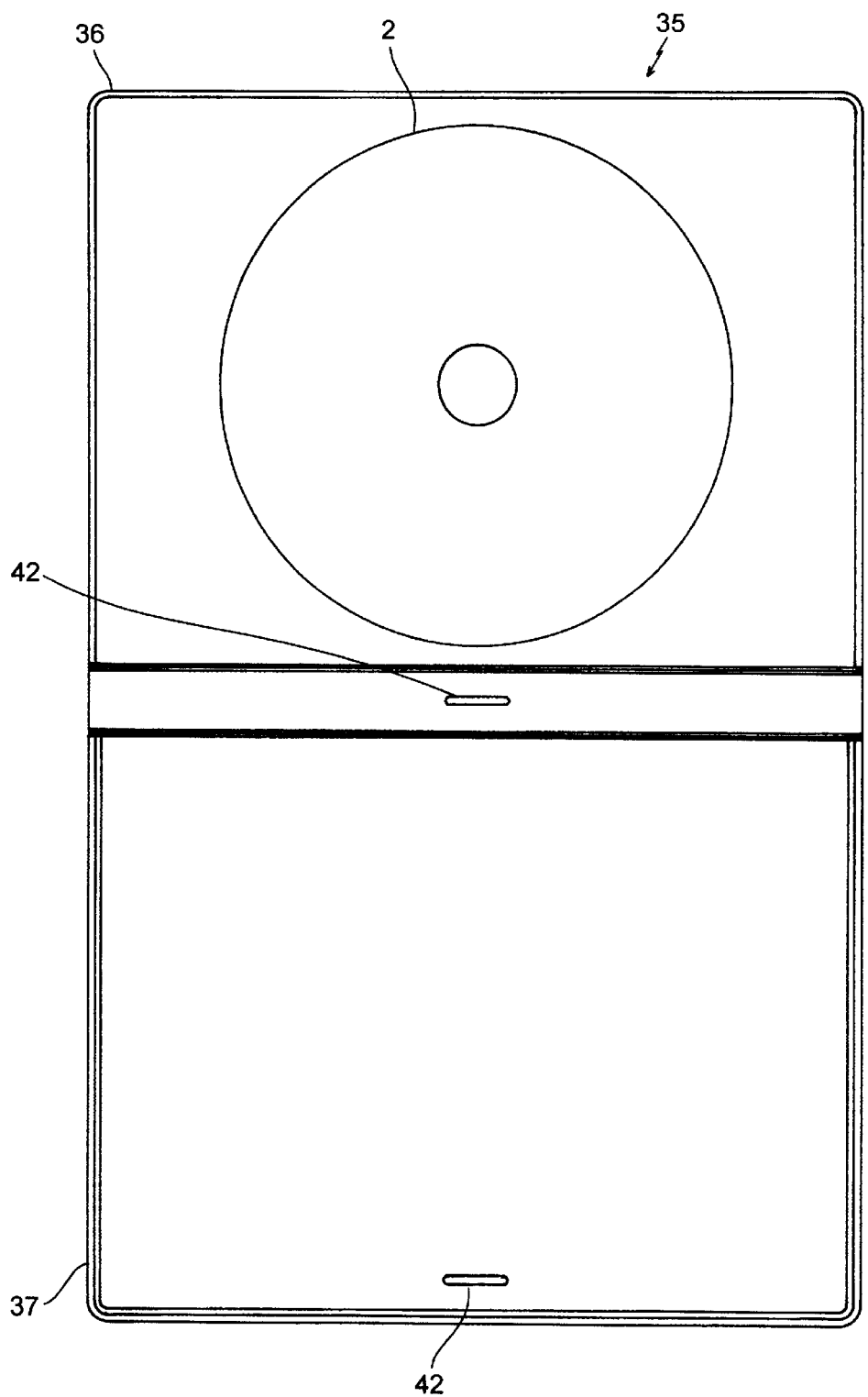
FIG. 19 is a plan view showing the fourth embodiment of the optical disc accommodating case according to the invention.
Figure 20:
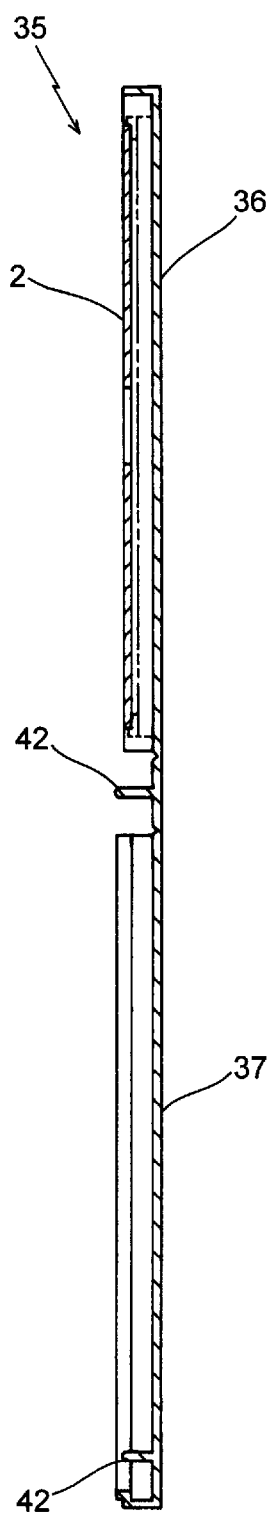
FIG. 20 is a sectional view showing the fourth embodiment of the optical disc accommodating case according to the invention in an open state.
Figure 21:
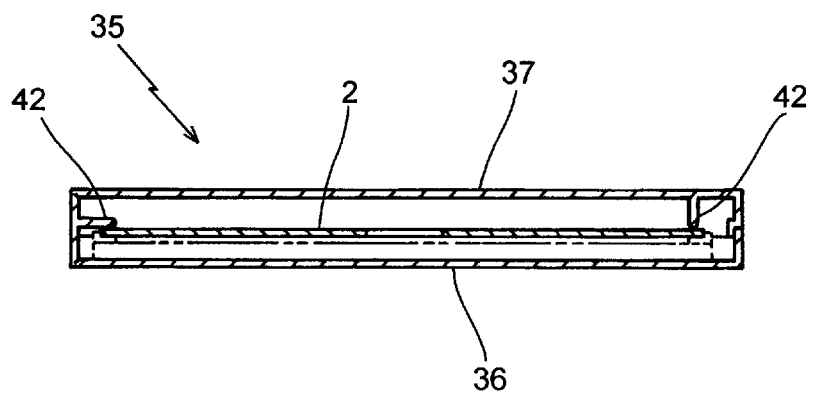
FIG. 21 is a sectional view showing the fourth embodiment of the optical disc accommodating case according to the invention in a closed state.

FIGS. 19 to 21 show a disc retainer structure for preventing detachment of an accommodated disc 2 from disc holder 38 due to a shock resulting from a fall or the like, if any, in a state that base member 36 is covered by the lid 37. As shown in FIGS. 19 and 20, two disc retainer members 42 are provided on a back portion of an inner surface of the optical disc accommodating case 35 and a front end portion of the lid 37. When the base member 36 is covered by the lid 37, as shown in FIG. 21, opposite end portions of the optical disc 2 are held downwardly, whereby detachment of the optical disc 2 from the disc holder 38 can be reliably prevented.

While the above embodiments have been described in connection with structure in which flexible portions 9b of lock members 9 extend in lateral directions parallel to a top of the disc bottom support 7, other structures are also conceivable. Specifically, it is also possible to conceive a structure in which the flexible portions 9b of lock members 9 extend upright from a top of the disc bottom support 7 so as to be flexible in a vertical direction. However, for ensuring sufficient flexibility of the flexible portions 9b, a certain fixed length is necessary. With structure in which the flexible portions extend in lateral directions, it is possible to freely set a length of the flexible portions. With the flexible portions extending upright, however, a limitation is imposed by a thickness direction dimension of an inner space of the casing, and it is difficult to ensure sufficient length of the flexible portions. Thus, it is preferable to adopt structure in which flexible portions 9b of lock members 9 extend in lateral directions parallel to a top of disc bottom support 7, as in the above individual embodiments.

As has been described in the foregoing, according to the invention an excellent optical disc accommodating case can be obtained, which permits convenient holding of an optical disc, and permits ready removal and accommodation of the disc without possibility of causing damage to an important central hole of the disc. In addition, it is possible to realize automatic loading of the optical disc in an assembling process, thus greatly simplifying the assembling process.

The optical disc accommodating case comprises a casing having a lid capable of being opened and closed, and a disc holder. The disc holder can removably hold an optical disc in the casing and is flexible such that its stem is held in the casing, and such that the disc holder is vertically lockable so as to be held in an upwardly tilted state toward a front in the casing. A front end of the disc holder is thus vertically lockable in response to opening and closing of the lid of the casing, and the casing has lock members for detachably holding a front end of the disc holder on a bottom of the casing. The optical disc accommodating case thus can be reliably applied to an assembling process performed by a robot, in which an optical disc is assembled in the optical disc accommodating case by causing the front end of the disc holder to be locked on the lock members. Also, a construction is obtainable, which can be conveniently used by a user such that the front end of the disc holder is vertically rocked in response to opening and closing of the lid.

Furthermore, the disc holder has a wall, which is provided on a stem side and can hold a corresponding side of an accommodated optical disc, and also has stoppers, which are provided on a side opposite the wall and permits the disc to be freely removed in an upwardly inclined direction while preventing detachment of the disc in a horizontal direction. Thus, an optical disc accommodated in the optical disc accommodating case can be reliably held without possibility of occasionally being detached in the horizontal direction, and can also be readily removed by moving the disc in an upwardly inclined direction such that the disc clears the stoppers.

Further, the wall has lock members provided at its opposite ends for preventing upward detachment of an optical disc, and lower portions of the end portions of the wall are cut away to separate end portions from the disc bottom support such that end locking portions of the lock members can be freely brought into contact with and spaced apart from an edge of an optical disc. It is thus possible to set a length of the flexible portions of lock members as desired so that the lock members are softly flexed to permit suitable loading of the optical disc.

Further, the end locking portions of the lock members have tapered portions tapering downwardly toward an inner periphery of an optical disc. When an optical disc being lowered toward the optical disc accommodating case strikes the tapered portions, the end locking portions are readily flexed toward an outer periphery to reliably guide the disc to the disc bottom support.

Further, the tapered portions of the end locking portions have stepped bottom surfaces extending substantially parallel with an accommodated optical disc top. Thus, when an optical disc being lowered toward the optical disc accommodating case clears the tapered portions of the end locking portions, its edge is locked by bottom surfaces of the tapered portions and prevented from being upwardly detached.

Further, a disc holder can slide into a casing and project from an opening of the casing formed on a front end side of an optical disc located within the casing. Thus, the optical disc can be removed without need of opening a lid of the casing with both hands.

What is claimed is:

1. An optical disc accommodating case, comprising:
   a casing; and
   a disc holder for detachably holding an optical disc in said casing, said disc holder including
   (i) a disc bottom support having a wall to contact an edge of the optical disc so as to prevent detachment of the optical disc from said disc bottom support in a direction toward said wall, and
   (ii) at least one lock member to prevent detachment of the optical disc from said disc bottom support in a direction away from said disc bottom support, wherein said at least one lock member is flexible such that upon contact of said at least one lock member by an outer periphery of the optical disc, via movement of the optical disc toward said disc bottom support, said at least one lock member flexes in a direction away from the optical disc so as to allow the optical disc to be received by said disc bottom support, wherein
   said disc holder is flexibly supported in said casing such that when said casing is opened said disc holder extends angularly from a bottom of said casing and when said casing is closed said disc holder is confined within said casing between the bottom of said casing and a top of said casing.

2. The optical disc accommodating case according to claim 1, wherein
   said wall and said at least one lock member are at a back portion of said disc holder, and
   said disc holder also includes stoppers, at a front portion of said disc holder, to prevent detachment of the optical disc from said disc holder in a direction away from said wall while allowing the optical disc to be removed from said disc holder in a direction angled away from said disc bottom support.

3. The optical disc accommodating case according to claim 1, wherein
   said at least one lock member includes
   (i) a movable portion of said wall that is movable relative to a remaining portion of said wall, and
   (ii) an end locking portion on said movable portion of said wall
   such that upon contact of said end locking portion by the optical disc, via movement of the optical disc toward said disc bottom support, said movable portion of said wall flexes in a direction away from the optical disc so as to allow the optical disc to pass beyond said end locking portion and be received by said disc bottom support, and after passage of the optical disc beyond said end locking portion said movable portion of said wall flexes in a direction toward the optical disc so as to cause said end locking portion to lock an edge of the optical disc.

4. The optical disc accommodating case according to claim 1, wherein
   said at least one lock member has a tapered portion that tapers in a direction toward said disc bottom support.

5. The optical disc accommodating case according to claim 4, wherein
   said tapered portion has a stepped bottom surface such that when the optical disc is received by said disc bottom support said stepped bottom surface is substantially parallel to a top surface of the optical disc.

6. The optical disc accommodating case according to claim 1, wherein
   said wall and said at least one lock member are at a back portion of said disc holder, and
   said disc holder also includes stoppers, at a front portion of said disc holder, to prevent detachment of the optical disc from said disc holder in a direction away from said wall while allowing the optical disc to be removed from said disc holder in a direction angled away from said disc bottom support.

7. An optical disc accommodating case, comprising:
   a casing;
   a disc holder for detachably holding an optical disc in said casing, said disc holder including (i) a disc bottom support having a wall to contact an edge of the optical disc so as to prevent detachment of the optical disc from said disc bottom support in a direction toward said wall, and (ii) at least one lock member to prevent detachment of the optical disc from said disc bottom support in a direction away from said disc bottom support, wherein said at least one lock member is flexible such that upon contact of said at least one lock member by the optical disc, via movement of the optical disc toward said disc bottom support, said at least one lock member flexes in a direction away from the optical disc so as to allow the optical disc to be received by said disc bottom support; and a locking member for detachably holding a front end of said disc holder on a bottom of said casing.

8. The optical disc accommodating case according to claim 7, wherein said disc holder is flexibly supported in said casing such that when said casing is opened and said locking member is released from said disc holder said disc holder extends angularly from the bottom of said casing, and when said casing is closed said disc holder is confined within said casing between the bottom of said casing and a top of said casing.

9. The optical disc accommodating case according to claim 7, wherein said wall and said at least one lock member are at a back portion of said disc holder, and said disc holder also includes stoppers, at a front portion of said disc holder, to prevent detachment of the optical disc from said disc holder in a direction away from said wall while allowing the optical disc to be removed from said disc holder in a direction angled away from said disc bottom support.

10. The optical disc accommodating case according to claim 7, wherein said at least one lock member includes
(i) a movable portion of said wall that is movable relative to a remaining portion of said wall, and
(ii) an end locking portion on said movable portion of said wall such that upon contact of said end locking portion by the optical disc, via movement of the optical disc toward said disc bottom support, said movable portion of said wall flexes in a direction away from the optical disc so as to allow the optical disc to pass beyond said end locking portion and be received by said disc bottom support, and after passage of the optical disc beyond said end locking portion said movable portion of said wall flexes in a direction toward the optical disc so as to cause said end locking portion to lock an edge of the optical disc.

11. The optical disc accommodating case according to claim 7, wherein said at least one lock member has a tapered portion that tapers in a direction toward said disc bottom support.

12. The optical disc accommodating case according to claim 11, wherein said tapered portion has a stepped bottom surface such that when the optical disc is received by said disc bottom support said stepped bottom surface is substantially parallel to a top surface of the optical disc.

13. An optical disc accommodating case, comprising:
a casing; and
a disc holder for detachably holding an optical disc in said casings, said disc holder including
(i) a disc bottom support having a wall to contact an edge of the optical disc so as to prevent detachment of the optical disc from said disc bottom support in a direction toward said wall, and (ii) at least one lock member to prevent detachment of the optical disc from said disc bottom support in a direction away from said disc bottom support, wherein said at least one lock member is flexible such that upon contact of said at least one lock member by the optical disc, via movement of the optical disc toward said disc bottom support, said at least one lock member flexes in a direction away from the optical disc so as to allow the optical disc to be received by said disc bottom support and, wherein said at least one lock member includes
(a) a movable portion of said wall that is movable relative to a remaining portion of said wall, and
(b) an end locking portion on said movable portion of said wall such that upon contact of said end locking portion by the optical disc, via movement of the optical disc toward said disc bottom support, said movable portion of said wall flexes in a direction away from the optical disc so as to allow the optical disc to pass beyond said end locking portion and be received by said disc bottom support, and after passage of the optical disc beyond said end locking portion said movable portion of said wall flexes in a direction toward the optical disc so as to cause said end locking portion to lock an edge of the optical disc.

14. The optical disc accommodating case according to claim 13, wherein said disc holder is flexibly supported in said casing such that when said casing is opened said disc holder extends angularly from a bottom of said casing, and when said casing is closed said disc holder is confined within said casing between the bottom of said casing and a top of said casing.

15. The optical disc accommodating case according to claim 13, wherein said disc holder is slidable into and from said casing via an opening at a front end of said casing.

16. The optical disc accommodating case according to claim 15, wherein said wall and said at least one lock member are at a back portion of said disc holder, and said disc holder also includes stoppers, at a front portion of said disc holder, to prevent detachment of the optical disc from said disc holder in a direction away from said wall while allowing the optical disc to be removed from said disc holder in a direction angled away from said disc bottom support.

17. The optical disc accommodating case according to claim 15, wherein said at least one lock member has a tapered portion that tapers in a direction toward said disc bottom support.

18. The optical disc accommodating case according to claim 17, wherein said tapered portion has a stepped bottom surface such that when the optical disc is received by said disc bottom support said stepped bottom surface is substantially parallel to a top surface of the optical disc.

* * * * *